United States Patent [19]
Cmelik et al.

[11] Patent Number: 5,771,368
[45] Date of Patent: Jun. 23, 1998

[54] MEMORY ADDRESSING SCHEME FOR INCREASING THE NUMBER OF MEMORY LOCATIONS AVAILABLE IN A COMPUTER FOR STORING HIGHER PRECISION NUMBERS

[75] Inventors: Robert Cmelik, Sunnyvale; Shing Kong, Menlo Park; Edmund Kelly, San Jose, all of Calif.

[73] Assignee: Sun Microsystems, Inc., Mountain View, Calif.

[21] Appl. No.: 449,258

[22] Filed: May 24, 1995

Related U.S. Application Data

[63] Continuation of Ser. No. 114,466, Aug. 31, 1993, abandoned, which is a continuation-in-part of Ser. No. 605,556, Oct. 29, 1990, abandoned.

[51] Int. Cl.$^6$ .................................................. G06F 12/10
[52] U.S. Cl. ...................... 395/410; 364/955; 364/255.1
[58] Field of Search ................................. 395/410, 500, 395/406, 412, 413, 416

[56] References Cited

U.S. PATENT DOCUMENTS

| | | | |
|---|---|---|---|
| 4,361,868 | 11/1982 | Kaplinsky | 395/400 |
| 4,482,952 | 11/1984 | Akagi | 395/400 |
| 4,800,489 | 1/1989 | Moyer et al. | 395/400 |
| 4,827,400 | 5/1989 | Dunwell et al. | 395/400 |
| 4,970,642 | 11/1990 | Yamamura | 395/425 |
| 5,109,334 | 4/1992 | Kamuro | 395/400 |
| 5,249,280 | 9/1993 | Nash et al. | 395/425 |
| 5,317,706 | 5/1994 | Pechter | 395/400 |

FOREIGN PATENT DOCUMENTS

| | | | |
|---|---|---|---|
| 0 483 967 | 6/1992 | European Pat. Off. | G09F 9/30 |
| 2 428 871 | 11/1980 | France | G06F 9/20 |
| 3 553 653 | 5/1971 | U.S.S.R. | G06F 9/36 |

OTHER PUBLICATIONS

IBM Technical Disclosure Bulletin vol. 16, No. 3, Aug. 1973, New York, US, pp. 771–772 K. W. Stevens "Addressing a Second Page of registers Without Increasing the Register Field Length" *the whole documet*.

Patent Abstracts of Japan; vol. 7, No. 260 (P–237) (1405) 18 Nov. 1983 & JP–A–58 142 464 (Hitachi Seisakusho K.K.) 24 Aug. 1983 *abstract*.

IBM Technical Disclosure Bulletin; vol. 16, No. 3, Aug. 1973, New York US, pp. 771–772; K.W. Stevens' Addressing a Second Page Registers Without Increasing the Register Field Length' *the whole document*.

Hewlett–Packard Journal; vol. 37, No. 8, Aug. 1986, Palo Alto US pp. 4–21; M.J. Mahone et al., 'Hewlett–Packard Precision Architecture: The Processor' *p. 8, left col.,line 5 paragraph 5–9*.

*Primary Examiner*—David Y. Eng
*Attorney, Agent, or Firm*—Blakely Sokoloff Taylor & Zafman LLP

[57] ABSTRACT

A backward compatible addressing scheme for increasing the number of memory locations available in a computer for storing higher precision numbers. The computer system of the present invention has a processor capable of manipulating numbers having precision S, where S is a power of 2. The memory locations are specified in an instruction address field by an n-bit logical address

$$E = \sum_{i=0}^{n-1} e_i 2^i,$$

Each S-precision number is stored in a group of S memory locations accessed by an m-bit physical address $$D = \sum_{i=0}^{m-1} d_i 2^i$$

Each memory location is capable of storing a single precision number. Addressing logic for addressing the memory locations with the logical addresses includes alignment logic for setting:

$$d_i = 0 \text{ for } 0 \leq i \leq (\log_2 S) - 1,$$

and setting $$d_i = e_i \text{ for } \log_2 S \leq i \leq n-1;$$

and extension logic for setting $$d_i = e_{i-n}$$

for $n \leq i \leq m-1$. The alignment logic may be implemented according to the logic equations $$d_i = e_i \sum_{j=0}^{i} s_j \quad 0 \leq i < k,$$

$$d_i = e_i \quad k \leq i < n$$

where k is the number of precision sizes capable of being manipulated by the processor and $$S = \sum_{i=0}^{k-1} s_i 2^i.$$

The extension logic may be implemented according to the logic equation $$d_i = e_{i-n} \sum_{j=i-n+1}^{k-1} s_j \quad n \leq i \leq n+k-2, i < m.$$

The memory locations may typically be microprocessor registers.

17 Claims, 6 Drawing Sheets

FIG. 1

*(Prior Art)*

| ORIGINAL REGISTERS | SINGLE | DOUBLE |
|---|---|---|
| | 0 | 0 |
| | 1 | |
| | 2 | 1 |
| | 3 | |
| | 4 | 2 |
| | 5 | |
| | 6 | 3 |
| | 7 | |
| | 8 | 4 |
| | 9 | |
| | 10 | 5 |
| | 11 | |
| | 12 | 6 |
| | 13 | |
| | 14 | 7 |
| | 15 | |
| | 16 | 8 |
| | 17 | |
| | 18 | 9 |
| | 19 | |
| | 20 | 10 |
| | 21 | |
| | 22 | 11 |
| | 23 | |
| | 24 | 12 |
| | 25 | |
| | 26 | 13 |
| | 27 | |
| | 28 | 14 |
| | 29 | |
| | 30 | 15 |
| | 31 | |

| ADDITIONAL REGISTERS | SINGLE | DOUBLE |
|---|---|---|
| | 32 | 16 |
| | 33 | |
| | 34 | 17 |
| | 35 | |
| | 36 | 18 |
| | 37 | |
| | 38 | 19 |
| | 39 | |
| | 40 | 20 |
| | 41 | |
| | 42 | 21 |
| | 43 | |
| | 44 | 22 |
| | 45 | |
| | 46 | 23 |
| | 47 | |
| | 48 | 24 |
| | 49 | |
| | 50 | 25 |
| | 51 | |
| | 52 | 26 |
| | 53 | |
| | 54 | 27 |
| | 55 | |
| | 56 | 28 |
| | 57 | |
| | 58 | 29 |
| | 59 | |
| | 60 | 30 |
| | 61 | |
| | 62 | 31 |
| | 63 | |

MEMORY ADDRESSING SCHEME FOR INCREASING THE NUMBER OF MEMORY LOCATIONS AVAILABLE IN A COMPUTER FOR STORING HIGHER PRECISION NUMBERS

This application is a continuation of U.S. patent application Ser. No. 08/114,466 filed Aug. 31, 1993 now abandoned which is a continuation-in-part application of U.S. patent application Ser. No. 07/605,556, filed Oct. 29, 1990 now abandoned.

BACKGROUND OF THE INVENTION

1. Field of the Invention

This invention relates to the field of data processing and, more particularly, to addressing memory locations in a computer system to use the address space more effectively when storing higher precision numbers.

2. Art Background

Processors execute instructions which perform operations on source operands to obtain a result. The registers that contain the source operands and the destination register for the result are specified in address fields of the instruction word. For example, in a computer based on a scalable processor architecture (SPARC) designed by Sun Microsystems, Inc., the assignee of the present invention, floating point instructions specify up to two floating point source registers and may specify a floating point destination register.

The number of registers available for addressing and the size of the operands used in a particular calculation depend upon the precision required in the result. In the SPARC Version 8 architecture, the floating point processor includes 32 individual registers, each capable of holding the 32 bits of one single precision operand. To obtain more precision in its arithmetic manipulations, a floating point processor may use the 32 registers in pairs to store 16 double precision numbers or in quadruples to hold 8 quadruple precision numbers.

Figure 1:
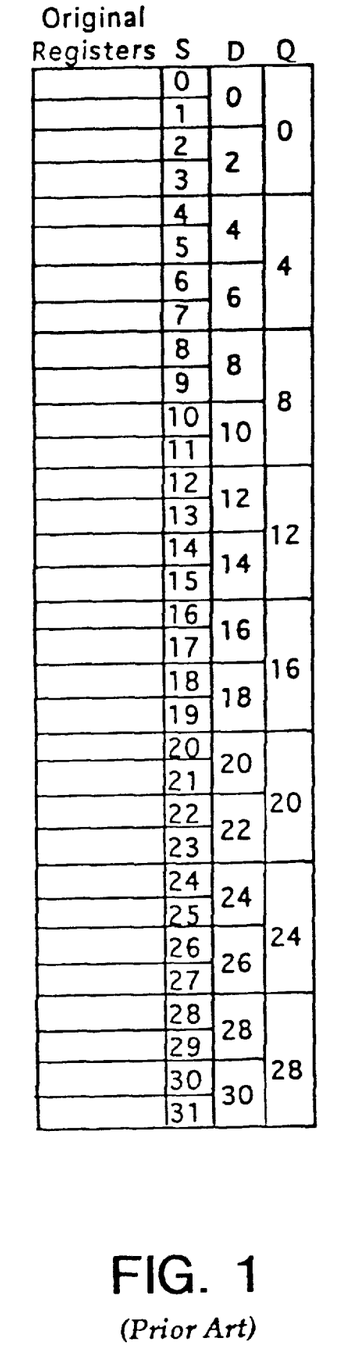
FIG. 1 illustrates a prior art address mapping scheme.

FIG. 1 illustrates the addressing of the SPARC Version 8 register file in this manner. In this example, a double precision operand has 64 bit positions and is held in two aligned floating point registers. Thus, one double precision number may be stored in register 0 and 1, another in registers 2 and 3, and so on in pairs. By aligning the registers, only one of the two registers need be addressed to select a particular double precision floating point number. In a like manner, a quadruple precision operand has 128 bit positions and is held in four aligned floating point registers, e.g., register 0, 1, 2 and 3. By aligning the registers only one of the four registers need be addressed to select a particular quadruple precision floating point number, and a similar saving in address bits is accomplished.

Using this aligned register convention, double precision numbers are stored at even numbered register addresses and quadruple precision numbers at every fourth register address. Because the processor only has five-bit instruction address fields, it can only address 16 double precision and 8 quadruple precision numbers using the five bits. Consequently, a number of addresses are unused for both double and quadruple precision arithmetic. The unused addresses designate single precision register positions which are conventionally unavailable to the double and quadruple precision operations.

It is desirable to find a way to use these omitted addresses to address additional registers for higher precision numbers, while at the same time remaining compatible with the addressing modes of instruction sets currently in use.

SUMMARY OF THE INVENTION

The present invention provides a backward compatible addressing scheme for increasing the number of memory locations available in a computer for storing higher precision numbers. The computer system of the present invention has a processor capable of manipulating numbers having precision S, where S is a power of 2. The memory locations are specified in an instruction address field by an n-bit logical address $$E = \sum_{i=0}^{n-1} e_i 2^i,$$

where $e_i$ are logical address binary coefficient signals. Each S-precision number is stored in a group of S memory locations accessed by an m-bit physical address $$D = \sum_{i=0}^{m-1} d_i 2^i,$$

where $d_i$ are physical address binary coefficient signals. Each memory location is capable of storing a single precision number. Addressing logic for addressing the memory locations with the logical addresses includes alignment logic for setting:

$$d_i = 0 \quad 0 \leq i \leq (\log_2 S) - 1,$$

and setting $$d_i = e_i \log_2 S \leq i \leq n-1;$$

and extension logic for setting $$d_i = e_{i-n} \quad n \leq i \leq m-1$$

The alignment logic may be implemented according to the logic equations $$d_i = e_i \sum_{j=0}^{i} s_j \quad 0 \leq i < k,$$

$$d_i = e_i \quad k \leq i < n$$

where k is the number of precision sizes capable of being manipulated by the processor and $$S = \sum_{i=0}^{k-1} s_i 2^i,$$

where $s_i$ are precision binary coefficient signals. The extension logic may be implemented according to the logic equation $$d_i = e_{i-n} \sum_{j=i-n+1}^{k-1} s_j \quad n \leq i \leq n+k-2, i < m.$$

The memory locations may typically be microprocessor registers.

BRIEF DESCRIPTION OF THE DRAWINGS

The objects, features and advantages of the present invention will be apparent to one skilled in the art in light of the following detailed description in which.

NOTATION AND NOMENCLATURE

Some portions of the detailed descriptions which follow are presented in terms of algorithms and symbolic representations of operations on bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to apparatus for operating a computer in processing electrical or other (e.g. mechanical, chemical) physical signals to generate other desired physical signals.

DETAILED DESCRIPTION OF THE INVENTION

The present invention provides a backward compatible addressing scheme for increasing the number of memory locations available in a computer for storing higher precision numbers. For purposes of explanation, specific embodiments are set forth to provide a thorough understanding of the present invention. However, it will be apparent to one skilled in the art that the invention may be practiced without these details. In other instances, well known elements, devices, process steps and the like are not set forth in detail in order to avoid unnecessarily obscuring the present invention.

Figure 2:
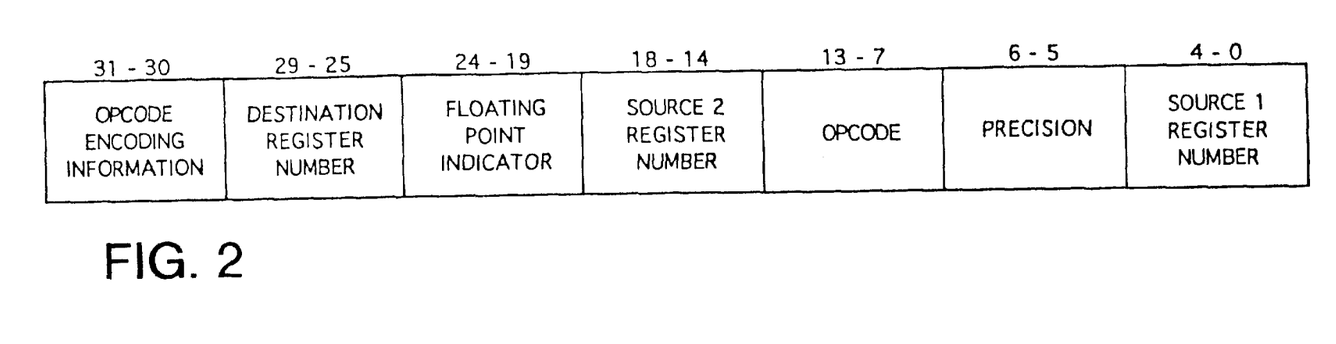
FIG. 2 illustrates the instruction format used by an embodiment of the present invention.

FIG. 2 illustrates the instruction format used by an embodiment of the present invention. Bits 7 through 13 specify the opcode of the instruction, bits 0 through 4 and 14 through 18 are the five bit addresses of the source 1 and source 2 registers, respectively, and bits 25 through 29 are the five bit destination register address. In addition, bits 5 and 6 designate whether the instruction is single precision, double precision or quadruple precision.

Figure 3:
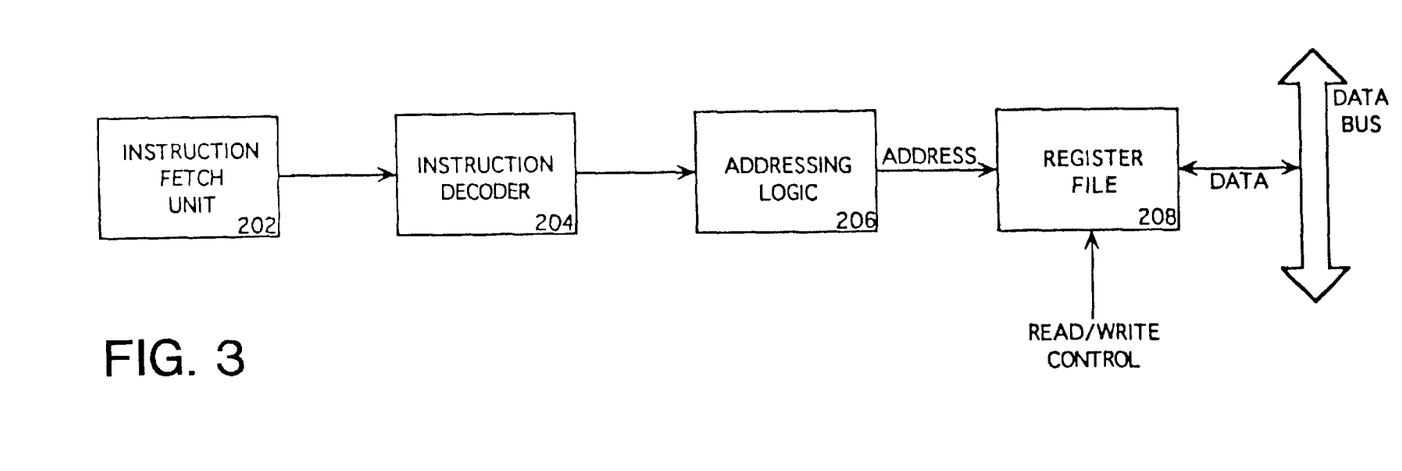
FIG. 3 is a block diagram of a microprocessor.

FIG. 3 is a simplified block diagram of a microprocessor. Instruction fetch unit 202 fetches instructions from memory. The instructions are decoded by instruction decoder 204, which provides the address as specified by the instruction to addressing logic 206. Addressing logic 206 converts the instruction register addresses into a form used to access the physical registers of the register file 208. The addresses are used to read from the source 1 and source 2 registers and to write to the destination register in the register file 208. The precision specified by bits 5 and 6 of the instruction determine the number of registers addressed by each address. That is, a single precision instruction operates using one register, a double precision instruction operates on pairs of registers, and a quadruple precision instruction accesses four registers at a time.

Figure 4:
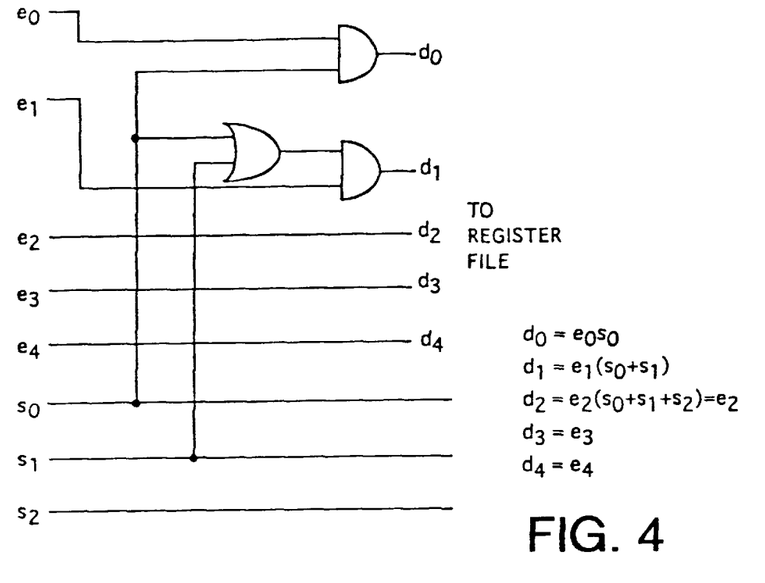
FIG. 4 illustrates conventional addressing logic.

FIG. 4 illustrates conventional addressing logic 206 (found in SPARC Version 8)that maps the logical addresses specified in the instruction to the physical addresses used by the register file 208. The physical memory address D is a function of the logical address E and the precision S. To comply with memory alignment requirements, the logical memory addresses in this prior art system must be an integer multiple of the precision, where the precision is a power of 2. The logical memory address E of the instruction may be represented by the logic equation:

$$E = \sum_{i=0}^{n-1} e_i 2^i,$$

and the physical address D presented to the register:

$$D = \sum_{i=0}^{m-1} d_i 2^i.$$

The precision S may be represented by:

$$S = \sum_{i=0}^{k-1} s_i 2^i,$$

where only one of the k values $s_i$ in the binary representation for S will be one because S is a power of 2.

To produce the physical address from the logical address and the precision, the functions performed by conventional addressing logic may be summarized by the following logic equations, which are basically a restatement of the alignment requirement:

$$d_i = e_i \sum_{j=0}^{i} s_j \quad 0 \leq i < k$$

$$d_i = e_i \quad k \leq i < n = m$$

Note that in the prior art the number of bits in the physical address m must equal the number of bits in the logical address n. The memory alignment requirements limit the number uniquely accessible memory regions to $2^{n-S+1}$. For example, in the case of the Version 8 SPARC architecture floating point register file, 32 single precision floating point registers may be accessed, while only 16 double-size registers and 8 quad-size registers may be accessed. For the case of n=m=5 bits, the equations produce the following mapping:

| | | $d_i$ | | |
|---|---|---|---|---|
| i | $e_i$ | Single Precision | Double Precision | Quadruple Precision |
| 0 | $e_0$ | $e_0$ | 0 | 0 |
| 1 | $e_1$ | $e_1$ | $e_1$ | 0 |
| 2 | $e_2$ | $e_2$ | $e_2$ | $e_2$ |
| 3 | $e_3$ | $e_3$ | $e_3$ | $e_3$ |
| 4 | $e_4$ | $e_4$ | $e_4$ | $e_4$ |
| Range (E) | | (0,1,2, . . . , 31) | (0,2,4, . . . , 30) | (0,4,8, . . . , 28) |

The chart illustrates that the least significant bit of a double word register address specifier is reserved and set to 0, and the least significant two bits of a quadword register address are set to 0. This insures that double words in the register file are addressed in aligned pairs and quad words in aligned groups of 4.

The conventional addressing scheme limits the number of double and quadruple precision numbers that may be addressed using 5 bits. It is desirable to achieve more effective use of all 5 bits of the logical address so that a full set of 32 double and quadruple precision register sets may be addressed using both the conventional aligned addresses and the omitted addresses. Clearly, for higher precision numbers, instructions could not perform addressing using both the aligned address and the omitted addresses because such a scheme would result in corruption of the data using the current register's configuration.

Figure 5:
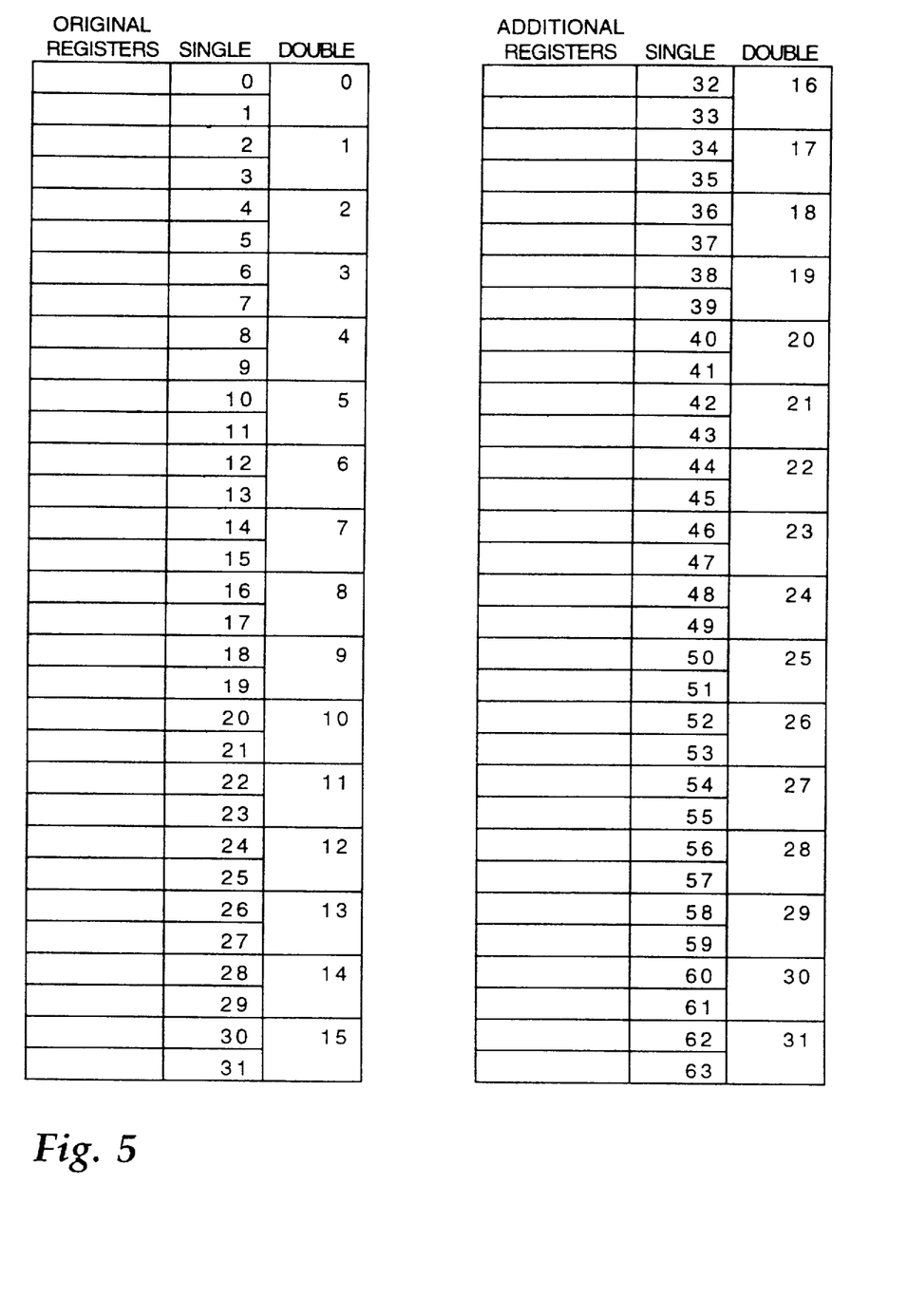
FIG. 5 illustrates a potential address mapping solution utilizing all five bits of the address field.

One solution to this problem would be to provide additional sets of registers for each precision to fill up the 5 bit address space, and perform a simple mapping of the form D=SE to address the physical registers. This mapping is shown for double word registers in FIG. 5. Double word address 0 addresses the register pair beginning with physical address 0, double word address 1 addresses the register pair starting with physical address 2, double word address 2 addresses the register pair beginning with physical address 4, and so on. For quadruple precision addressing, logical address 0 would address physical 0, logical address 1 would address physical address 4, logical address 2 would address physical address 8, and so on.

The problem with this scheme is that it does not satisfy the alignment requirement for the original registers and is thus not backward compatible with the prior art addressing scheme. Present instruction sets are designed so that each higher precision address is the same as the address of the first single precision register in the group of registers corresponding to the higher precision address. Double word address 2 starts at single word address 2, double word address 4 starts at single word address 4, etc., and quad-word address 4 starts at single word address 4, quad-word address 8 starts at single word address 8, etc. in the original register file. One can see from FIG. 5 that this correspondence does not exist for the proposed solution. Accordingly, this scheme would not be compatible with the current design of instruction sets for which much software has been written.

Figure 6:
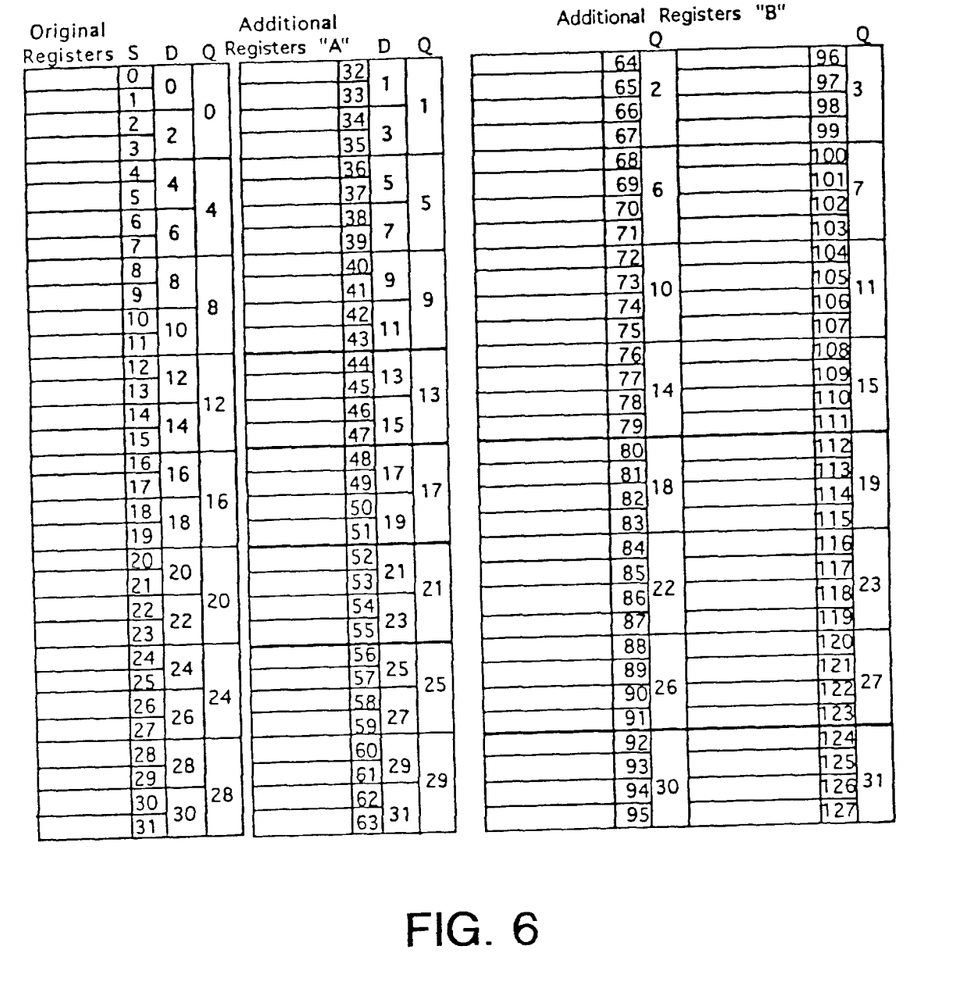
FIG. 6 illustrates a memory address mapping according to the present invention.

The present invention provides for full utilization of the address space when addressing higher precision numbers as well as compatibility with the existing register addressing scheme. FIG. 6 illustrates memory addressing according to the present invention. Let n equal the number of bits in the logical address E, m the number of bits in the physical address D, and k equal the number of precision sizes available in the instruction set. FIG. 6 illustrates the present invention for the case n=5 (32 original registers), m=7 (128 total registers) and k=3 (single, double and quadruple precision numbers). For the original set of 32 registers, the present invention maintains the same correspondence of the double word and quad word addresses to the physical registers as found in the existing addressing scheme. The present invention further addresses additional registers with the double word and quad word addresses omitted by the prior art. Thus, for example, the odd numbered addresses omitted from the normal addressing scheme for double precision registers are used to address pairs of the additional registers. This allows a full set of 32 double precision registers to be addressed using the 5 bit logical address.

The mapping of the logical address E to the physical address D of the present invention may be summarized by the following logic equations:

$$E = \sum_{i=0}^{n-1} e_i 2^i,$$

$$D = \sum_{i=0}^{m-1} d_i 2^i.$$

$$S = \sum_{i=0}^{k-1} s_i 2^i,$$

where k=the number of precision sizes available to the processor, $$d_i = e_i \sum_{j=0}^{i} s_j \quad 0 \leq i < k$$

$$d_i = e_i \quad k \leq i < n$$

$$d_i = e_{i-n} \sum_{j=i-n+1}^{k-1} s_j \quad n \leq i \leq n+k-2, i < m$$

Using these equations the number of uniquely accessible registers becomes $2^n$ for $S \leq 2^{m-n}$.

Figure 7:
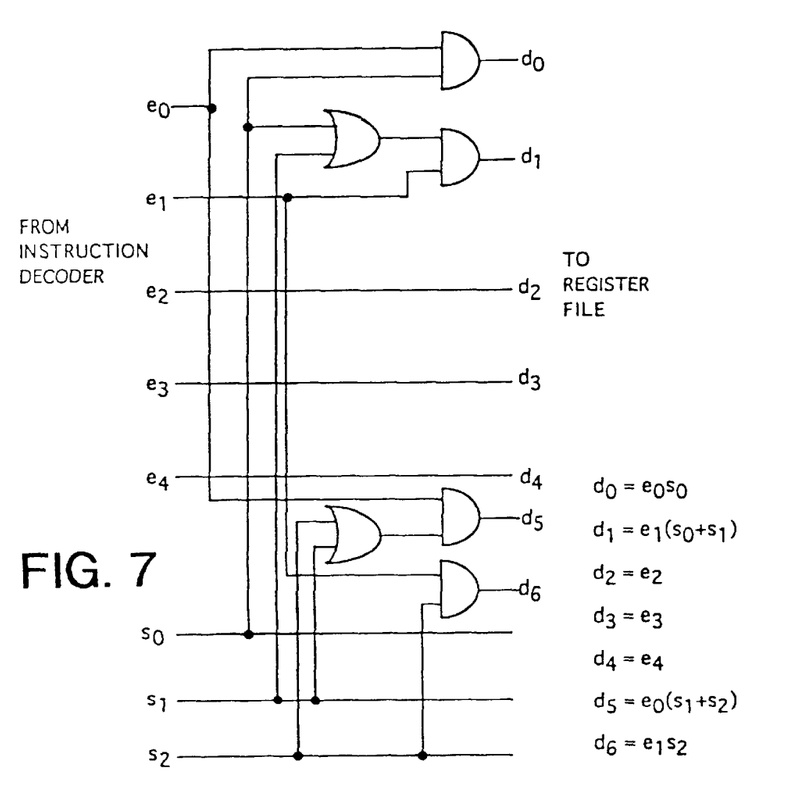
FIG. 7 illustrates an embodiment of the addressing logic of the present invention.
Figure 8:
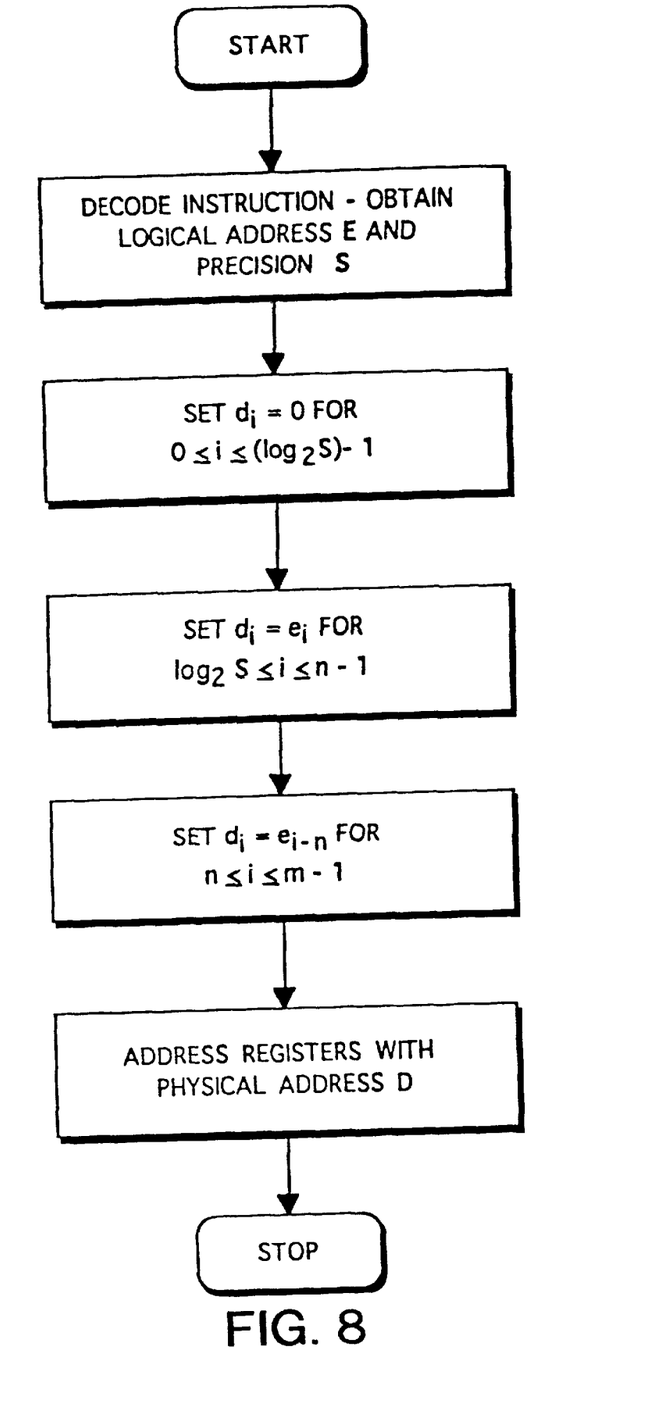
FIG. 8 is a flowchart diagramming the process of the present invention.

These equations may be implemented using the circuit of FIG. 7 for the case n=5, m=7 and k=3. A flow chart of the method of the present invention is diagrammed in FIG. 8.

For these parameters, the equations take the form $d_0 = e_0 s_0$
$d_1 = e_1(s_0 + s_1)$
$d_2 = e_2(s_0 + s_1 + s_2) = e_2$
$d_3 = e_3$
$d_4 = e_4$
$d_5 = e_0(s_1 + s_2)$
$d_6 = e_1 s_2$ Alternatively, the equations may be expressed as:

$d_i = 0 \quad 0 \leq i \leq (\log_2 S) - 1$
$d_i = e_i \quad \log_2 S \leq i \leq n-1$
$d_i = e_{i-n} \quad n \leq i \leq m-1$ These equations result in the following address mapping.

| | | $d_i$ | | |
|---|---|---|---|---|
| i | $e_i$ | Single Precision | Double Precision | Quadruple Precision |
| 0 | $e_0$ | $e_0$ | 0 | 0 |
| 1 | $e_1$ | $e_1$ | $e_1$ | 0 |
| 2 | $e_2$ | $e_2$ | $e_2$ | $e_2$ |
| 3 | $e_3$ | $e_3$ | $e_3$ | $e_3$ |

-continued

| | | $d_i$ | | |
|---|---|---|---|---|
| i | $e_i$ | Single Precision | Double Precision | Quadruple Precision |
| 4 | $e_4$ | $e_4$ | $e_4$ | $e_4$ |
| 5 | | 0 | $e_0$ | $e_0$ |
| 6 | | 0 | 0 | $e_1$ |
| Range (E) | | (0,1,2, . . . , 31) | (0,1,2, . . . , 31) | (0,1,2, . . . , 31) |

This table illustrates that the present invention allows the full five bit address space ($e_0$, $e_1$, $e_2$, $e_3$, $e_4$) to be used to address $2^n$ S-precision numbers. At the same time, the physical memory addresses remain aligned to maintain compatibility with conventional addressing schemes.

Although the invention has been described in conjunction with preferred embodiments, it will be appreciated that various modifications and alterations may be made by those skilled in the art without departing from the spirit and scope of the invention.

We claim:

1. In a computer system including
 a processor for processing a plurality of numbers having precision S, where S is a power of 2,
 computer-readable memory locations specified in a computer-readable instruction address field by an n-bit logical address, each computer-readable memory location being adapted to store a single precision number, said computer-readable memory locations being adapted for storing numbers having precision S in a group of S computer-readable memory locations accessed by an m-bit physical address
 a backward compatible addressing logic circuit for addressing said computer-readable memory locations with up to $2^n$ distinct n-bit logical addresses, said addressing logic circuit comprising:
  alignment logic circuit having an input, for receiving said n-bit logical address, and an output for generating n bits of said physical addresses as a function of precision;
  extension logic circuit having an input, for receiving (m−n) logical address binary bits via a bus coupled to said input of said alignment logic circuit, and an output for generating (m−n) physical address bits as a function of precision.

2. The computer system of claim 1 wherein
said n-bit logical address is specified by $$E = \sum_{i=0}^{n-1} e_i 2^i,$$

where $e_i$ are logical address binary bits,
 said m-bit physical address is specified by $$D = \sum_{i=0}^{m-1} d_i 2^i,$$

where $d_i$ are physical address binary bits,
 said n physical address binary bits generated by said output of said alignment logic is specified by $d_i=0$ for $0 \leq i \leq (\log_2 S)-1$ and $d_i=e_i$ for $\log_2 S \leq i \leq n-1$; and
 said (m−n) physical address binary bits generated by said output of said extension logic is specified by $d_i=e_{i-n}$ for $n \leq i \leq m-1$.

3. The addressing logic of claim 2, wherein k is a number of precision sizes of the plurality of numbers having precision S, $$S = \sum_{i=0}^{k-1} s_i 2^i,$$

where $s_i$ are precision binary bits, and said alignment logic circuit generates the physical address binary bits $d_i$ according to the following logic equations:

$$d_i = e_i \sum_{j=0}^{i} s_j \quad 0 \leq i < k$$

$$d_i = e_i \quad k \leq i < n.$$

4. The alignment logic of claim 3, wherein n=5, m=7, and k=3, said alignment logic including
 first AND gate having a first input for receiving the logical address binary bits (LABB) $e_o$ and a second input for receiving precision binary bits (PBB) $s_o$, said first AND gate further having an output for generating physical address binary bits (PABB) $d_o$
 OR gate having a first and second inputs for receiving PBCS $s_o$ and respectively $s_1$, said OR gate further having an output for generating an OR output signal,
 second AND gate having a first input for receiving said OR output signal and a second input for receiving PBB $s_1$, said second AND gate further having an output for generating PABC $d_1$
 first, second, and third buses for receiving, respectively, LABB $e_2$, $e_3$, and $e_4$ and for generating, respectively, PABB $d_2$, $d_3$, and $d_4$, where $d_2=e_2$, $d_3=e_3$, and $d_4=e_4$.

5. The addressing logic of claim 2, wherein k is a number of precision sizes of the plurality of numbers having precision S, $$S = \sum_{i=0}^{k-1} s_i 2^i,$$

where $s_i$ are precision binary bits, and said extension logic generates the physical address binary bits $d_i$ according to the following logic equation:

$$d_i = e_{i-n} \sum_{j=i-n+1}^{k-1} s_j \quad n \leq i \leq n+k-2, i < m.$$

6. The extension logic of claim 5, wherein n=5, m=7, and k=3,
 said extension logic including,
  OR gate having first and second input for receiving, respectively, PBB $s_1$ and $s_2$, said OR gate further having an output for generating an OR output signal
  first AND gate having a first input for receiving LABB $e_o$ and a second input for receiving said OR output signal, said first AND gate further having an output for generating PABB $d_5$
  second AND gate having a first input for receiving LABB $e_1$ and a second input for receiving PBB $s_2$, said second AND gate further having an output for generating PABB $d_6$.

7. The addressing logic of claim 1, wherein said memory locations are microprocessor registers.

8. The method of claim 7, wherein said memory locations are addressed with said physical address binary bits $d_i$ for $0 \leq i \leq m-1$.

9. In a computer system including
a processor for processing a plurality of numbers having precision S, where S is a power of 2,
computer-readable memory locations specified in a computer-readable instruction address field by an n-bit logical address, each computer-readable memory location being adapted to store a single precision number, said computer-readable memory locations being adapted for storing numbers having precision S in a group of S computer-readable memory locations accessed by an m-bit physical address,
a computer-implemented method for addressing, in a backward compatible fashion, said memory locations with said logical addresses, said method comprising the steps of:
(a) receiving logical address binary bits;
(b) responsive to the received logical address binary bits, generating m physical address binary bits as a function of precision.

10. The computer system of claim 9 wherein
said n-bit logical address is specified by $$E = \sum_{i=0}^{n-1} e_i 2^i,$$

where $e_i$ are logical address binary bits,
said m-bit physical address is specified by $$D = \sum_{i=0}^{m-1} d_i 2^i,$$

where $d_i$ are physical address binary bits,
said step (b) comprises the steps of,
(c) generating the physical address binary bits $d_i=0$ for $0 \leq i \leq (\log_2 S)-1$,
(d) generating the physical address binary bits $d_i=e_i$ for $\log_2 S \leq i \leq n-1$, and
(e) generating the physical address binary bits $d_i=e_{i-n}$ for $n \leq i \leq m-1$.

11. The method of claim 10, wherein k is a number of precision sizes of the plurality of numbers having precision S, $$S = \sum_{i=0}^{k-1} s_i 2^i,$$

where $s_i$ are precision binary bits,
step (c) is implemented according to the logic equation:

$$d_i = e_i \sum_{j=0}^{i} s_j \quad 0 \leq i < k$$

and step (d) is implemented according to the logic equation:

$$d_i = e_i, k \leq i < n.$$

12. The method of claim 10, wherein k is a number of precision sizes of the plurality of numbers having precision S, $$S = \sum_{i=0}^{k-1} s_i 2^i,$$

where $s_i$ are precision binary bits, and step (e) is implemented according to the logic equation:

$$d_i = e_{i-n} \sum_{j=i-n+1}^{k-1} s_j \quad n \leq i \leq n+k-2, i < m.$$

13. The method of claim 9, wherein said memory locations are microprocessor registers.

14. A processor for processing a plurality of numbers having precision S, where S is a power of 2, the processor having a first plurality of computer-readable memory locations addressable by a first plurality of logical addresses E, each logical address of the first plurality of logical addresses having the form cS, where c is from the set $\{0, 1, \ldots, ((r/S)-1)\}$, r being the number of computer-readable memory locations in the first plurality of computer-readable memory locations, each computer-readable memory location in the first plurality of memory locations being capable of storing a single precision number, the memory locations of the first plurality of memory locations being addressable in groups of S, the processor further comprising:
a plurality of S−1 additional pluralities of computer-readable memory locations, each computer-readable memory location in each additional plurality of computer-readable memory locations being capable of storing a single precision number, the computer-readable memory locations in each additional plurality of memory locations being addressable in groups of S, r being the number of computer-readable memory locations in each additional plurality of computer-readable memory locations; and
addressing logic for addressing the plurality of S−1 additional pluralities of memory computer-readable locations using an associated additional plurality of logical addresses for each additional plurality of computer-readable memory locations, each address of an i-th associated additional plurality of logical addresses having the form cS+i where i is from the set $\{1, 2, \ldots, S-1\}$, the addressing logic being coupled to the additional pluralities of computer-readable memory locations.

15. The processor of claim 14, wherein computer-readable memory locations are specified in an instruction address field by an n-bit logical address $$E = \sum_{i=0}^{n-1} e_i 2^i,$$

where $e_i$ are logical address binary bits, each S-precision number is accessed by an m-bit physical address $$D = \sum_{i=0}^{m-1} d_i 2^i,$$

where $d_i$ are physical address binary bits,
said addressing logic includes
alignment logic having an input, for receiving said logical address binary bits, and an output for generating the physical address binary bits $d_i=0$ for $0 \leq i \leq (\log_2 S)-1$ and $d_i=e_i$ for $\log_2 S \leq i \leq n-1$; and
extension logic having an input, for receiving (m−n) logical address binary bits via a bus coupled to said input of said alignment logic, and an output for generating the physical address binary bits $d_i = e_{i-n}$ for $n \leq i \leq m-1$.

16. The processor of claim 15, wherein k is a number of precision sizes of the plurality of numbers having precision S, $$S = \sum_{i=0}^{k-1} s_i 2^i,$$

where $s_i$ are precision binary bits, and said alignment logic generates the precision address binary bits $d_i$ according to the following logic equations:

$$d_i = e_i \sum_{j=0}^{i} s_j \quad 0 \leq i < k$$

$$d_i = e_i \quad k \leq i < n.$$

17. The processor of claim 15, wherein k is a number of precision sizes of the plurality of numbers having precision S, $$S = \sum_{i=0}^{k-1} s_i 2^i,$$

where $s_i$ are precision binary bits, and said extension logic generates the precision address binary bits $d_i$ according to the following logic equation:

$$d_i = e_{i-n} \sum_{j=i-n+1}^{k-1} s_j \quad n \leq i \leq n+k-2, i < m.$$

* * * * *